United States Patent Office 3,539,603
Patented Nov. 10, 1970

3,539,603
ADDITION POLYMERIZATION PROCESS
Thomas J. Clough, Webster Groves, Mo., assignor to Atlantic Richfield Company, a corporation of Pennsylvania
No Drawing. Continuation-in-part of applications Ser. No. 440,949, Mar. 18, 1965, and Ser. No. 513,125, Dec. 10, 1965, which said Ser. No. 513,125 is a continuation-in-part of application Ser. No. 446,410, Apr. 17, 1965. This application July 26, 1967, Ser. No. 656,030
The portion of the term of the patent subsequent to June 17, 1986, has been disclaimed
Int. Cl. C10m 1/20, 3/10, 3/20
U.S. Cl. 260—407                    15 Claims

ABSTRACT OF THE DISCLOSURE

Normal mono-1-alkenes of 5 to about 25 carbon atoms are polymerized with olefinically-unsaturated fatty acids (or esters or amides thereof) wherein the olefinic bond is at least 2 carbon atoms away from the acid, ester, or amide group and, optionally, conjugated diene hydrocarbons. The method is one employing Friedel-Crafts catalysis and involves the use of a catalyst solution having about 2–7 wt. percent of aluminum chloride in ethyl chloride, reaction temperatures of about 0 to 50° C., the use of high ratios of catalyst to monomers (about 2–30% of aluminum chloride by weight of total monomers), and, preferably, the separate introduction of catalyst solution and monomers to the reaction zone.

---

This application is a continuation-in-part of copending applications S.N. 440,949, filed Mar. 18, 1965, and S.N. 513,125, filed Dec. 10, 1965, which latter application is in turn a continuation-in-part of application S.N. 446,410, filed Apr. 17, 1965, all of which are now abandoned.

The present invention relates to a method of polymerizing normal mono-1-alkenes of 5 to about 25 carbon atoms with an olefinically-unsaturated fatty acid (or ester or amide thereof) and, optionally, a diene hydrocarbon. Relatively long-chain normal mono-1-alkenes, i.e., those having at least 5 carbon atoms, are generally characterized as possessing slow addition polymerization rates. Thus, in comparison with their lower molecular weight counterparts, as, for example, ethylene, propylene and isobutylene, the longer chain materials enter into polymerization reactions through their olefinically or ethylenically unsaturated groups at significantly lower reaction rates. Contrastingly, ethylenically unsaturated monomers such as styrene, 1,3-butadiene, etc. form additional polymerization products quite readily and, in relation to longer-chain alpha-olefins, may be characterized as fast polymerizing monomers. Due to this disparity in polymerization rates, attempts to prepare copolymers of the longer-chain alpha-olefins with faster reacting monomers in any significant yields have been largely unsuccessful. Most often, attempts at copolymerization have proceeded to form a product consisting primarily of homopolymers of the fast polymerizing monomer, and no significant yields of copolymers could be achieved.

By the polymerization method of the present invention normal alpha-olefins of 5 to about 25 carbon atoms will polymerize with ethylenically-unsaturated fatty acids (or amides or esters thereof) and, optionally, diene hydrocarbons to form viscous copolymeric oils which are useful, for example, in forming detergent additives for mineral lubricating oils. The method of the invention involves the use of an aluminum trichloride-catalyzed solution polymerization system wherein high catalyst-to-monomer ratios are employed in combination with relatively high reaction temperatures.

The normal mono-1-alkenes to be polymerized by the method of the present invention have 5 to about 25 carbon atoms, preferably about 12 to 21 carbon atoms. Often, a mixture of alpha-olefins derived from petroleum processing may be employed. Preferably, such mixtures are homologous and primarily span a range of about 4 to 8 carbon atoms. Illustrative of such mixtures is the $C_{14}$–$C_{21}$ alpha-olefin mixture employed in the examples herein.

The unsaturated acids, amides or esters polymerized with the alpha-olefins according to the method of the present invention are olefinically-unsaturated, monocarboxylic acids of 4 to about 26 carbon atoms, which have a non-olefinically-unsaturated carbon-to-carbon chain of at least 2 carbon atoms separating the carbonyl carbon atom of the acid from all olefinic bonds therein, and esters and amides of such acids. Suitable such acids, esters and amides include those have the formulae:

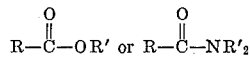

wherein R is an olefinically-unsaturated, substituted or unsubstituted, hydrocarbon radical of 3 to about 25, preferably about 4 to 20, or even 8 to 18, carbon atoms. The R group, which may be substituted with, for example, acetylenic, aromatic, or other non-interfering groups, contains 1 or more, preferably 1 to 2, olefinic bonds. As stated above, the acid, ester or amide group

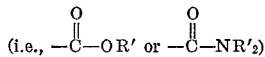

is separated, however, from the olefinic bond, or bonds, in R by a non-olefinically-unsaturated carbon-to-carbon chain of at least 2, preferably at least about 6 or even at least about 8, carbon atoms. By "non-olefinically-unsaturated" is meant having no olefinic bonds. That is, while the R group is olefinically-unsaturated, the carbonyl carbon atom of the acid, ester or amide group is, however, attached to a non-olefinic carbon atom, and preferably the carbonyl carbon atom is at least about 6, or even at least about 8, carbon atoms removed from the first olefinic bond (i.e., at least 5 or 7 carbon atoms removed from the first olefinic carbon atom). The non-olefinically-unsaturated carbon-to-carbon chain separating the olefinic bond, or bonds, from the acid, ester or amide group may be paraffinic, cycloaliphatic, aromatic, etc., so long as it is not olefinically-unsaturated; it is often preferred that the chain be paraffinic. Preferably, R has only non-terminal olefinic unsaturation.

R' in the above formulae is hydrogen or hydrocarbyl, preferably alkyl, of 1 to 15 carbon atoms, most preferably lower alkyl, say of 1 to 3 carbon atoms. When the ester or amide is employed, salt formation of the acid with the catalyst used for the polymerization is retarded. Examples of acids which may be used are oleic, linoleic, undecylenic, linolenic, ricinoleic, vinyl acetic, etc. Examples of esters and amides include the lower alkyl esters of these acids, including the glycerides and, especially, the methyl esters, and the unsubstituted, i.e. primary, amides of these acids.

The conjugated, diethylenically or diolefinically unsaturated, aliphatic hydrocarbons which may be polymerized with the alpha-olefin and unsaturated acid or ester include the polymerizable, conjugated, diethylenically unsaturated alkenes having from 4 to 12 carbon atoms, preferably 4 to 5 carbons, e.g., conjugated diolefins with a terminal double bond such as 1,3-butadiene, isoprene, etc. The diolefin may be substituted with, e.g., halogen, etc., so long as the substituent does not interfere with the polymerization or have any other significant deleterious effect. An example of a substituted, conjugated diolefin is chloroprene.

It will often be desired that the choice of unsaturated acid (or amide or ester thereof), conjugated, diethylenically unsaturated, aliphatic hydrocarbon and alpha-olefin, their ratios and the extent of reaction are such as to give an oil-soluble polymer; when such oil-solubility is sought, usually the total number of carbon atoms in the acid (or amide or ester thereof) and alpha mono-olefin reactants is at least about 12, preferably at least about 18. Also, more than one acid, amide, ester, conjugated diethylenically unsaturated aliphatic hydrocarbon or α-olefin can be used in forming a given polymer, and minor amounts of other polymerizable monomers may be present.

The proportions of the various monomers in the reactant mixture may, of course, vary according to the particular olefin, acid (or amide or ester thereof) and diene employed, the properties sought in the final copolymer, etc. Thus, where dienes are to be included in the polymerization it is often preferred, in order to ensure high copolymer yields, that the alpha-olefin be present in the reactant mixture in greater molar amounts than the diene. Also, certain fatty acid esters, e.g., methyl oleate, behave such that the maximum amount thereof which can be incorporated in the copolymer product may be about 10 mol percent. Generally, however, the method of the present invention may be employed to prepare polymers of about 15–95, preferably about 20–90, mol percent of the normal mono-1-alkene, about 3–85, preferably about 5–40, mol percent of the unsaturated acid (or amide or ester thereof) and about 0–70, or even 80, mol percent of the diene hydrocarbon. Often, when it is desired to exclude the diene hydrocarbon from the polymerization, it is preferred to prepare polymers of about 90–60 mol percent of the normal mono-1-alkene and about 10–40 mol percent of the unsaturated acid (or amide or ester thereof). When the inclusion of the diene hydrocarbon is desired, it will often be preferred to prepare polymers of about 85–20 mol percent of the alkene, about 5–25 mol percent of the unsaturated acid (or amide or ester thereof) and about 10–70 mol percent of the diene.

The catalyst employed in the polymerization is aluminum trichloride; other Friedel-Crafts catalysts have generally been found to be unsuitable, possibly due to their lower strengths and, in some cases, to their lower solubility in the solvent employed in the present method. The catalyst is provided in solution in ethyl chloride, in which medium the alpha-olefin feed is likewise soluble, and the catalyst is essentially anhydrous. Whereas the prior art has often considered ethyl chloride and methyl chloride to be equally suitable as solvents for catalyst and reactants in a Friedel-Crafts polymerization system, it has now been found that the methyl halide is generally unsuited as a solvent medium in the polymerization method of the present invention, the solvent action of the methyl chloride on the halide catalyst being insufficient to provide the high concentration of dissolved catalyst necessary in the present method. Ethyl chloride, moreover, by virtue of its higher boiling point, provides an efficient means, through solvent refluxing, of maintaining reaction temperatures within the preferred range, as will be more fully discussed hereinafter. Higher alkyl chlorides have been found to be generally unsuitable as solvents, due to their poisoning effect on the catalyst.

The solution of $AlCl_3$ catalyst in ethyl chloride may contain at least about 2% and up to about 7%, by weight, of the catalyst, preferably about 4 to 6 weight percent. This catalyst solution can be supplied to the reaction zone in amounts sufficient to provide about 0.1 to 15 volumes of catalyst solution per volume of total monomer feed, preferably about 0.5 to 5 vol./vol. The strength of the catalyst solution and the volumetric ratio of that solution to monomer feed will be coordinated within the aforementioned ranges to provide at least about 2, or even at least about 5, and up to about 25, or even about 30, percent of $AlCl_3$ catalyst by weight of the monomer fed. It is often preferred to use about 10 to 25 weight percent of catalyst based on the weight amount of monomer fed. These catalyst percentages refer to the excess of catalyst over and above that portion, if any, which may chemically combine or complex with the monomers and/or polymer product, as, for instance, may occur where linoleic acid is present in the monomer feed, the free carboxyl group thereof being inclined to chemically combine with aluminum trichloride. The foregoing proportions represent a significantly higher ratio of catalyst to monomer than has been preferred in Friedel-Crafts polymerizations in the prior art. Thus, for example, whereas prior copolymerization reactions—for instance, the copolymerization of isobutylene with isoprene or butadiene—have most often been conducted using about one gram of Friedel-Crafts catalyst per 200 to 1000 grams of monomer fed, there is usually employed in the present invention several times, say at least about 4 times, the weight amount of catalyst used in the prior art. Use of the smaller catalyst concentrations in an attempt to copolymerize the unmatched monomers of this invention would, once again, result in the production of substantially homopolymeric products or no polymerization.

In this invention, polymerization is carried out in the liquid phase, employing controlled introduction of the monomer feedstock and the catalyst solution into a reaction zone. The reaction temperature may range from about 0, preferably from about 5, up to about 25 or even 50° C.; condensing or refluxing means can be advantageously employed to keep some of the components in the liquid state at those temperatures. For example, Dry Ice traps may be used to reflux the ethyl chloride, which is above its boiling point at the preferred reaction temperatures. Polymerization temperatures employed in the method of the present invention are also significantly higher than those usually employed in prior art Friedel-Crafts-catalyzed polymerization methods; the latter have been preferably operated, for example, in the range of about −20 to −101° C. The use of higher temperatures in the present process, wherein long-chain alpha-olefins are reacted, results in the production of liquid polymerization products, whereas lower reaction temperatures provide solid products, once again primarily composed of homopolymers of the fast-acting monomers.

Ordinarily, atmospheric pressure is satisfactory for conducting the polymerization but super-atmospheric pressures, for example up to about 7 p.s.i.g. (the vapor pressure at room temperature of ethylchloride) or higher, may be employed if desired.

The polymerization may be conducted batchwise, continuously, or in a semi-continuous manner. The different monomers may be added separately and simultaneously, or in admixture, or even sequentially, provided that the alphaolefin is added first if the catalyst be present. It is often preferred, however, to add the monomers in admixture. The catalyst solution, however, should not be pre-admixed alone with the unsaturated acid (or amide or ester thereof), or any diene which may be present in the feed. A portion of the ethyl chloride, if desired, may be introduced with the monomer feed.

The invention will be better understood by reference to the following examples which are to be considered illustrative only and not limiting.

The apparatus employed in Examples I through V comprises a reaction vessel fitted with a stirrer, needle valves for the introduction of olefin and catalyst feeds and a Dry Ice trap. A graduated cylinder also provided with a Dry Ice trap is arranged to receive the ethyl chloride which evolves during the reaction.

In Examples VI through X a continuous method of polymerization is employed, using a pressurized catalyst feed and a back-mix reactor. The olefin feed is first charged to a reservoir vessel and then pumped directly into the reactor at atmospheric pressure. Catalyst and solvent are charged to pressure vessels and stirred under a pressure of 100 p.s.i. of nitrogen for 45 minutes. The resulting catalyst solution is then pumped at 120 to 170 p.s.i through a pressure reduction valve and into the back-mix reactor which is maintained at atmospheric pressure.

EXAMPLE I

To a mixture of alpha-olefins of the following approximate composition.

| Component: | Wt. percent |
|---|---|
| Total olefins | 95+ |
| Total α-olefins | 94 |
| Straight chain α-olefins | 86 |
| Branched and naphthenic olefins | 3 |
| Straight chain, α, ω-diolefins | 6 |
| Saturated and aromatic hydrocarbons | 4 |

Molecular weight distribution, number of carbon atoms:

| | |
|---|---|
| 14 | 1 |
| 15 | 12 |
| 16 | 19 |
| 17 | 18 |
| 18 | 18 |
| 19 | 17 |
| 20 | 14 |
| 21 | 1 | was added isoprene and linoleic acid in a mole ratio of alpha-olefin to isoprene to linoleic acid of 6.65/2.45/1.0, based on the average molecular weight (243) of the alpha-olefin mixture. The olefin intake was charged with the olefin-linoleic acid-isoprene feed, and the catalyst intake was charged with a catalyst solution consisting of 5.2 grams of aluminum chloride per 100 ml. of ethyl chloride at 12° C.

Both reactant feed and catalyst solution were introduced into the reaction flask simultaneously, the olefin-linoleic acid-isoprene mixture at a rate of 24.2 ml. per minute (0.0615 mole per minute $C_{14}$–$C_{21}$ alpha-olefin, 0.026 mole per minute isoprene, 0.00923 mole per minute linoleic acid), the catalyst solution at a rate of 49 ml. per minute (0.0192 mole per minute aluminum chloride). The total time for the addition was 10 minutes and the polymerization mixture was stirred for an additional 20 minutes. The temperature during the polymerization was 16° C. and 320 ml. (61%) of ethyl chloride was trapped out of the polymerization system. Hexane, 400 ml., and 400 ml. of isopropanol were added to quench the catalyst.

The polymer was washed with dilute hydrochloric acid and washed three additional times with water. The polymer was stripped of solvents and had a KV at 100° F. of 3603 cs.; KV at 210° F. of 199.54 cs.; acid number of 25.44; iodine number of 43.9; and a specific gravity of 08778.

EXAMPLE II

To a mixture of the alpha-olefin feed as in Example I was added 1,3-butadiene and methyl oleate in a mole ratio of methyl oleate to butadiene to alpha-olefin of 1 to 3 to 4, based on the average molecular weight of the alpha-olefin mixture. Into one charge vessel was added alpha-olefin-methyl oleate-butadiene feed, and to the other charge vessel was added a catalyst solution of 5.2 grams of aluminum chloride per 100 ml. of ethyl chloride at 12° C. Both the monomer feed and the catalyst solution were introduced into the reaction flask simultaneously, the monomer feed at a rate of 19.6 ml. per minute and the catalyst solution at a rate of 49.4 ml. per minute. The total time for addition was 12 minutes and the polymerization mixture was stirred for an additional 12 minutes. The temperature during polymerization was 15.5° C. and 340 ml. of ethyl chloride (57.5%) were trapped out of the system. The catalyst was quenched with 400 ml. hexane and 400 ml. of isopropanol. The polymer was washed with water and topped of solvents. The polymer had a saponification number of 38.0, specific gravity of 0.8897, iodine number of 32.0; KV at 100° F. of 1317.0 cs.

EXAMPLE III

To a mixture of the alpha-olefin feed as in Example I were added isoprene and methyl oleate to produce a mole ratio of alpha-olefin-isoprene-methyl oleate of 6.05 to 2.05 to 1.00, based on the average molecular weight of the alpha-olefin mixture. The olefin intake was charged with the reactant feed, and the catalyst intake was charged with a catalyst solution consisting of 5.2 grams of aluminum chloride per 100 ml. of ethyl chloride. Both the olefin feed and the catalyst solution were introduced into the reaction flask simultaneously, the olefin mixture at a rate of 20.8 ml. per minute (0.0525 mole per minute alpha-olefin, 0.0173 mole per minute isoprene, 0.00860 mole per minute methyl oleate), the catalyst solution at a rate of 39.5 ml. per minute (0.0154 mole per minute aluminum chloride). The total time for addition was 12 minutes and the polymerization was continued for an additional 28 minutes. The temperature during polymerization was 16° C. and 280 ml. (59%) of ethyl chloride was trapped out of the polymerization system. Hexane, 400 ml., and 400 ml. of isopropanol were added to quench the catalyst. The polymer was washed with water and, after topping of solvents, had the following properties: KV at 100° F. of 1190 cs.; KV at 210° F. of 94.54 cs.; iodine number, 30.7; saponification number, 24.3; specific gravity, 0.8780.

EXAMPLE IV

To a mixture of the alpha-olefin feed as in Example I was added linoleic acid in a mole ratio of alpha-olefin to linoleic acid of 5 to 1, based on the average molecular weight (243) of the alpha-olefin mixture. The olefin intake was charged with the olefin-linoleic acid feed, and the catalyst intake was charged with a catalyst solution consisting of 5.2 grams aluminum chloride per 100 ml. of ethyl chloride at 12° C.

Both the olefin-linoleic acid feed and the catalyst solution were introduced into the reaction flask simultaneously, the olefin-linoleic acid mixture at a rate of 22.0 ml. per minute (0.0590 mole per minute $C_{15}$–$C_{20}$ alpha-olefin, 0.0118 mole per minute linoleic acid) and the catalyst solution at a rate of 60 ml. per minute (0.0234 mole per minute aluminum chloride). The total time for the addition of olefin-linoleic acid and catalyst solution was 8 minutes and the polymerization mixture was stirred for an additional 13 minutes. The temperature during the polymerization was 14° C. and 185 ml. of ethyl chloride was trapped out of the polymerization system. Hexane, 400 ml., and 400 ml. of isopropanol were added to quench the catalyst.

The polymer was washed with dilute hydrochloric acid and washed three additional times with water. The polymer was stripped of solvents and had a KV at 210° F. of 113.76 cs., acid number of 35.41 and an iodine number of 42.9.

EXAMPLE V

To a mixture of the alpha-olefin feed as in Example I was added undecylenic acid in a mole ratio of alpha-olefin to undecylenic acid of 6 to 1, based on the average molecular weight of the alpha-olefin mixture. Into one charge vessel was added the olefin-undecylenic acid mixture and to the other charge vessel was added a catalyst solution of 5.2 grams of aluminum chloride per 100 ml. of ethyl chloride at 12° C. Both the olefin-acid feed and catalyst solution were introduced into the reaction flask simultaneously, the olefin-acid feed at a rate of 21.2 ml. per minute and the catalyst solution at a rate of 60 ml. per minute. The total time for addition was 12 minutes and the polymerization mixture was stirred for an additional 13 minutes. The temperature during polymerization was 14° C. and 220 ml. of ethyl chloride was trapped out of the system. The catalyst was quenched with isopropanol, and the polymer washed with dilute hydrochloric acid. The polymer was washed with water and topped of solvents. The polymer had an acid number of 30.68, specific gravity of 0.8771, iodine number of 45.5, KV at 100° F. of 4882.0 cs., and a KV at 210° F. of 229.86 cs.

EXAMPLE VI

To a mixture of the alpha-olefin feed as in Example I were added 1,3-butadiene and methyl oleate in a mole ratio of methyl oleate to butadiene to alpha-olefin of 1 to 6 to 8, based on the average molecular weight of the alpha-olefin mixture. The monomer mixture and catalyst solution (4.8 g. $AlCl_3$/100 cc. EtCl solution) were fed separately at a volumetric ratio of catalyst solution to monomer mixture of 3/1 into an empty back mix reactor, and the temperature maintained at 14–17° C. by distillation of ethyl chloride. Approximately 50 to 60 volume percent of input catalyst solution was distilled. Feeding was continued and, when a residence time of 40 minutes was attained, portions of the reactant mixture were removed from the reactor at a rate so adjusted that the reactant volume in the reactor remained constant. These portions were immediately quenched in water at 50–80° C. and wet ethyl chloride was distilled from the quench tank and collected. Operation under these conditions was continued for a total of 4 residence times (160 minutes measured from the initial time) to alow the reactor to reach equilibrium. During the fifth residence time, the quench feed was switched to a new quench tank, and the non-equilibrium product in the first quench tank discarded. Simultaneous and continuous feeding of the reactor and collection of the product was continued until it was desired to cease operations. The product layer was separated from the aqueous layer, solvent washed and stripped to yield a clear, amber liquid having a saponification number of 18.4; specific gravity of 0.8776; iodine number of 23.4; KV at 100° F. of 3870 cs., and a KV at 210° F. of 243.9.

EXAMPLE VII–X

The terpolymers of these examples were prepared according to the procedure given in, and employing the reactants of, Example VI; monomer ratios, catalyst ratio and residence times were varied as indicated in the following table:

TABLE I

| Example | Molar ratios | | | Catalyst solution/ monomer, vol. | Residence times, min. |
|---|---|---|---|---|---|
| | Methyl oleate | Alpha-olefin | Buta-diene | | |
| VII | 1 | 4 | 3 | 3/1 | 20 |
| VIII | 1 | 8 | 6 | 3/1 | 10 |
| IX | 1 | 8 | 6 | 5/1 | 6 |
| X | 1 | 4 | 3 | 5/1 | 24 |

The resulting polymer products analyzed as follows:

TABLE II

| Example | Sap. No. | Spec. grav. | Iod. No. | Kinematic viscosity, cs. | |
|---|---|---|---|---|---|
| | | | | 100° F. | 210° F. |
| VII | 38.2 | 0.8924 | 42.5 | 1,110 | 87.12 |
| VIII | 15.8 | 0.8821 | 32.2 | 1,550 | 113.10 |
| IX | 19.2 | 0.8735 | 37.8 | 2,449 | 175.06 |
| X | 23.7 | 0.8847 | 40.2 | 2,174 | 161.76 |

It is claimed:
1. A method for preparing normally-liquid polymers of about 15 to 95 mol percent of normal mono-1-alkene of 5 to about 25 carbon atoms, about 3 to 85 mol percent of material having the formula:

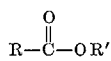

wherein R is an olefinically-unsaturated, aliphatic hydrocarbon radical of 3 to about 25 carbon atoms and 1 to 2 olefinic bonds, the carbonyl carbon atom being separated from all olefinic bonds in R by a non-olefinically-unsaturated carbon-to-carbon chain of at least 2 carbon atoms, and R' is selected from the group consisting of hydrogen and alkyl of 1 to about 15 carbon atoms, and 0 to about 80 mol percent of conjugated, diethylenically unsaturated, aliphatic hydrocarbon of 4 to about 12 carbon atoms, which comprises feeding said alkene, said material, and said hydrocarbon to a reaction zone maintained at a temperature of about 0 to 50° C. and feeding to the reaction zone a catalyst solution consisting essentially of about 2 to 7 weight percent of aluminum chloride in ethyl chloride, the rates of addition of said alkene, material, hydrocarbon, and catalyst solution providing about 2 to 30 percent of aluminum chloride, based on the total weight of the alkene, material, and hydrocarbon fed.

2. The method of claim 1 wherein the catalyst solution is fed to the reaction zone separately from said alkene, said material and said hydrocarbon.

3. The method of claim 1 wherein the mono-1-alkene has about 12 to 21 carbon atoms.

4. The method of claim 1 wherein the reaction zone temperature is about 5 to 50° C.

5. The method of claim 1 wherein the rates of addition of said alkene, material, hydrocarbon, and catalyst solution provide about 5 to 25 percent of aluminum chloride based on the total weight of the said alkene, material, and hydrocarbon fed.

6. The method of claim 1 wherein the catalyst solution consists essentially of about 4 to 6 weight percent of aluminum chloride in ethyl chloride.

7. The method of claim 3 wherein the material is methyl oleate.

8. The method of claim 3 wherein the material is linoleic acid.

9. The method of claim 3 wherein the material is undecylenic acid.

10. The method of claim 1 wherein polymers are prepared of about 90 to 60 mole percent of the alkene and about 10 to 40 mol percent of the material.

11. The method of claim 1 wherein polymers are prepared of about 85 to 20 mol percent of the alkene, about 5 to 25 mol percent of the material, and about 10 to 70 mol percent of the hydrocarbon.

12. The method of claim 11 wherein the hydrocarbon is butadiene-1,3.

13. The method of claim 11 wherein the hydrocarbon is isoprene.

14. A mehod for preparing normally-liquid polymers of about 90 to 60 mol percent of normal mono-1-alkene of about 12 to 21 carbon atoms and about 10 to 40 mol percent of material having the formula:

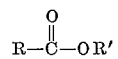

wherein R is an olefinically-unsaturated, aliphatic hydrocarbon radical of about 8 to 18 carbon atoms and 1 to 2 olefinic bonds, the carbonyl carbon atom being separated from all olefinic bonds in R by a paraffinic carbon-to-carbon chain of at least about 6 carbon atoms, and R' is selected from the group consisting of hydrogen and lower alkyl, which comprises feeding said alkene and said material to a reaction zone maintained at a temperature of about 5 to 50° C. and feeding to the reaction zone and separately from said material a catalyst solution consisting essentially of about 4 to 6 weight percent of aluminum chloride in ethyl chloride, the rates of addition of said alkene, material, and catalyst solution providing about 5 to 25 percent of aluminum chloride, based on the total weight of alkene and material fed.

15. A method for preparing normally-liquid polymers of about 20 to 85 mol percent of normal mono-1-alkene of about 12 to 21 carbon atoms, about 5 to 25 mol percent of material having the formula:

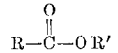

wherein R is an olefinically-unsaturated, aliphatic hydrocarbon radical of about 8 to 18 carbon atoms and 1 to 2 olefinic bonds, the carbonyl carbon atom being separated from all olefinic bonds in R by a paraffinic carbon-to-carbon chain of at least about 6 carbon atoms, and R' is selected from the group consisting of hydrogen and lower alkyl, and about 10 to 70 mol percent of conjugated, diethylenically unsaturated, aliphatic hydrocarbon of 4 to 5 carbon atoms, which comprises feeding said alkene, said material, and said hydrocarbon to a reaction zone maintained at a temperature of about 10 to 30° C. and feeding to the reaction zone and separately from said material and said hydrocarbon a catalyst solution consisting essentially of about 4 to 6 weight percent of aluminum chloride in ethyl chloride, the rates of addition of said alkene, material, hydrocarbon, and catalyst solution providing about 5 to 25 percent of aluminum chloride, based on the total weight of alkene, material, and hydrocarbon fed.

References Cited

UNITED STATES PATENTS

| | | | |
|---|---|---|---|
| 2,168,271 | 8/1939 | Perquin et al. | 260—407 XR |
| 2,435,631 | 2/1948 | Lieber | 260—404.5 XR |
| 2,551,642 | 5/1951 | Garwood et al. | 260—413 XR |
| 2,623,890 | 12/1952 | Verley | 260—407 |
| 3,097,220 | 7/1963 | Barrett et al. | 260—407 |

FOREIGN PATENTS

| | | |
|---|---|---|
| 791,739 | 12/1935 | France. |
| 461,853 | 2/1937 | Great Britain. |

BERNARD HELFIN, Primary Examiner

H. T. MARS, Assistant Examiner

U.S. Cl. X.R.

252—51.5, 56; 260—404.5, 475, 485, 515, 533, 550, 561, 404